United States Patent
Kasinoff (10) Patent No.: US 6,982,388 B2
(45) Date of Patent: Jan. 3, 2006

(54) FOOD PRODUCT SCALE WITH CUSTOMER VOICE PROMPTING AND RELATED METHODS

(75) Inventor: Harvey A. Kasinoff, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 276 days.

(21) Appl. No.: 10/423,114

(22) Filed: Apr. 25, 2003

(65) Prior Publication Data
US 2004/0211599 A1 Oct. 28, 2004

(51) Int. Cl.
G01G 19/40 (2006.01)

(52) U.S. Cl. ............... 177/2; 177/25.15; 705/16; 705/23; 705/414; 705/416; 186/61; 235/283

(58) Field of Classification Search ............... 186/61; 235/383; 177/2–12, 25.15; 705/407, 16, 705/23, 414, 416
See application file for complete search history.

(56) References Cited

U.S. PATENT DOCUMENTS

| | | | |
|---|---|---|---|
| 4,576,244 A | 3/1986 | Zeigner et al. | 177/245 |
| 4,779,706 A * | 10/1988 | Mergenthaler | 186/61 |
| 4,853,678 A | 8/1989 | Bishop, Jr. et al. | 340/286.01 |
| 5,083,638 A * | 1/1992 | Schneider | 186/61 |
| 5,305,197 A | 4/1994 | Axler et al. | 705/14 |
| 5,504,675 A * | 4/1996 | Cragun et al. | 705/14 |
| 5,578,797 A * | 11/1996 | Hewitt et al. | 177/5 |
| 5,615,120 A | 3/1997 | Schwartz et al. | 705/407 |
| 5,952,642 A | 9/1999 | Lutz | 235/383 |
| 5,987,428 A | 11/1999 | Walter | 705/23 |
| 6,032,128 A | 2/2000 | Morrison et al. | 705/23 |
| 6,089,454 A | 7/2000 | Sadler | 235/383 |
| 6,105,866 A * | 8/2000 | Morrison et al. | 235/383 |
| 6,155,486 A | 12/2000 | Lutz | 235/383 |
| 6,189,790 B1 | 2/2001 | Walter | 235/383 |
| 6,367,020 B1 * | 4/2002 | Klein | 713/202 |
| 6,434,530 B1 | 8/2002 | Sloane et al. | 705/1 |
| 6,477,514 B1 * | 11/2002 | Gil et al. | 705/410 |
| 6,540,137 B1 * | 4/2003 | Forsythe et al. | 235/383 |
| 6,779,904 B1 * | 8/2004 | Van Dyk | 362/86 |
| 2001/0042025 A1 | 11/2001 | Yonezawa et al. | 705/26 |
| 2002/0054330 A1 * | 5/2002 | Jinbo et al. | |
| 2002/0079367 A1 | 6/2002 | Montani | 235/383 |

OTHER PUBLICATIONS

Polaroid Corporation Brochure—Ultrasonic Ranging System—Description, operation and use information for conducting tests and experiments with Polaroid's Ultrasonice Ranging System components—P1834-May 1992-32 pages.

* cited by examiner

Primary Examiner—Randy W. Gibson
(74) Attorney, Agent, or Firm—Thompson Hine LLP

(57) ABSTRACT

A food product scale system includes a customer detecting functionality and a voice functionality for outputting one or more audible voice messages when a customer is detected. When a customer is at a first distance from a weighing station of the scale a customer attracting message may be output and when the customer is at a second, closer distance from the weighing station an instruction message may be output. Other electronic devices may utilize a similar staged message feature.

24 Claims, 4 Drawing Sheets

//FOOD PRODUCT SCALE WITH CUSTOMER
VOICE PROMPTING AND RELATED
METHODS

TECHNICAL FIELD

The present invention relates generally to scales of the type commonly used in groceries and supermarkets for weighing produce and other foods and, more particularly, to a food product scale including customer voice prompting based upon detection of a customer in proximity to the scale.

BACKGROUND

It is known to provide self-service scales in perishable food departments of stores to enable customers to weigh and label their own food products. Customer use of such self-service scales reduces the workload at the customer checkout because store personnel do not need to weigh items at checkout. However, some customers are reluctant to utilize self-service scales and still other customers fail to recognize the purpose of the scales.

Accordingly, it would be desirable and advantageous to provide a scale system and method that promotes greater use of the scale by customers.

SUMMARY

In one aspect, a scale system for use by store customers in weighing food products includes a weighing station for receiving items to be weighed, the weighing station having an associated mechanism for producing weight indicative signals. A controller receives weight indicative signals from the mechanism, the controller operable to establish a price for a weighed item based in part upon a weight indicative signal produced for that item. A detection system is provided for detecting a customer within an area in proximity to the weighing station. A voice module having at least one stored message and an associated audio output device is provided for outputting the message in an audible manner. The voice module operates to output the message when the detection system detects the customer in the area.

In another aspect, a scale system for weighing and pricing items includes a weighing unit including a weighing station for receiving items to be weighed, a mechanism for producing weight indicative signals when items are placed on the weighing station and a control portion that operates to establish a price for a weighed item based in part upon a weight indicative signal produced for that item. A detection system detects a person within a set distance from the weighing station. A voice module having at least one stored message and an associated audio output device for outputting the message in an audible manner is provided. The voice module operates to output the message when the detection system detects a person within the set distance.

In a further aspect, in a store including a perishables food department having a self-service scale and associated label printing mechanism located therein, a method of promoting customer use of the self-service scale involves the steps of: detecting a customer at a first location spaced from the scale and responsively outputting a first audible message for attracting the customer closer to the scale; and detecting the customer at a second location nearer the scale than the first location and responsively outputting an audible message including one or more instructions for using the scale.

In another aspect, a self-service scale system is located in a perishables food department of a store and has an associated label printing mechanism. The self service scale system is adapted to weight items, price the items and print labels for the items. The self-service scale system is also adapted to detect a customer in proximity to a weighing station of the scale system and to responsively output an audible message relating to use of the scale. In a store including a perishables food department:

In still another aspect, a self-service scale system is located in a perishables food department of a store and has an associated label printing mechanism. The self service scale system is adapted weight items, price the items and print labels to be applied to the items. The self-service scale system is also adapted to output audible messages to customers in proximity to a weighing station of the scale system, including a first message to attract customers closer to the weighing station and a second message providing instructions on use of the scale system.

In yet another aspect, a self-service electronic device adapted to promote usage thereof by persons in proximity to the device includes a user interface for receiving information from a person. A detection system detects a person at a first location relative to the user interface and at a second location relative to the user interface, the second location closer to the user interface than the first location. A voice module has at least first and second stored messages and an associated audio output device for outputting messages in an audible manner. The voice module operates to output the first message when the detection system detects a person at the first location and to output the second message when the detection system detects a person at the second location. The first message comprises a message to attract persons closer to the user interface and the second message comprises a message instructing persons on use of the electronic device.

DESCRIPTION

Figure 1:
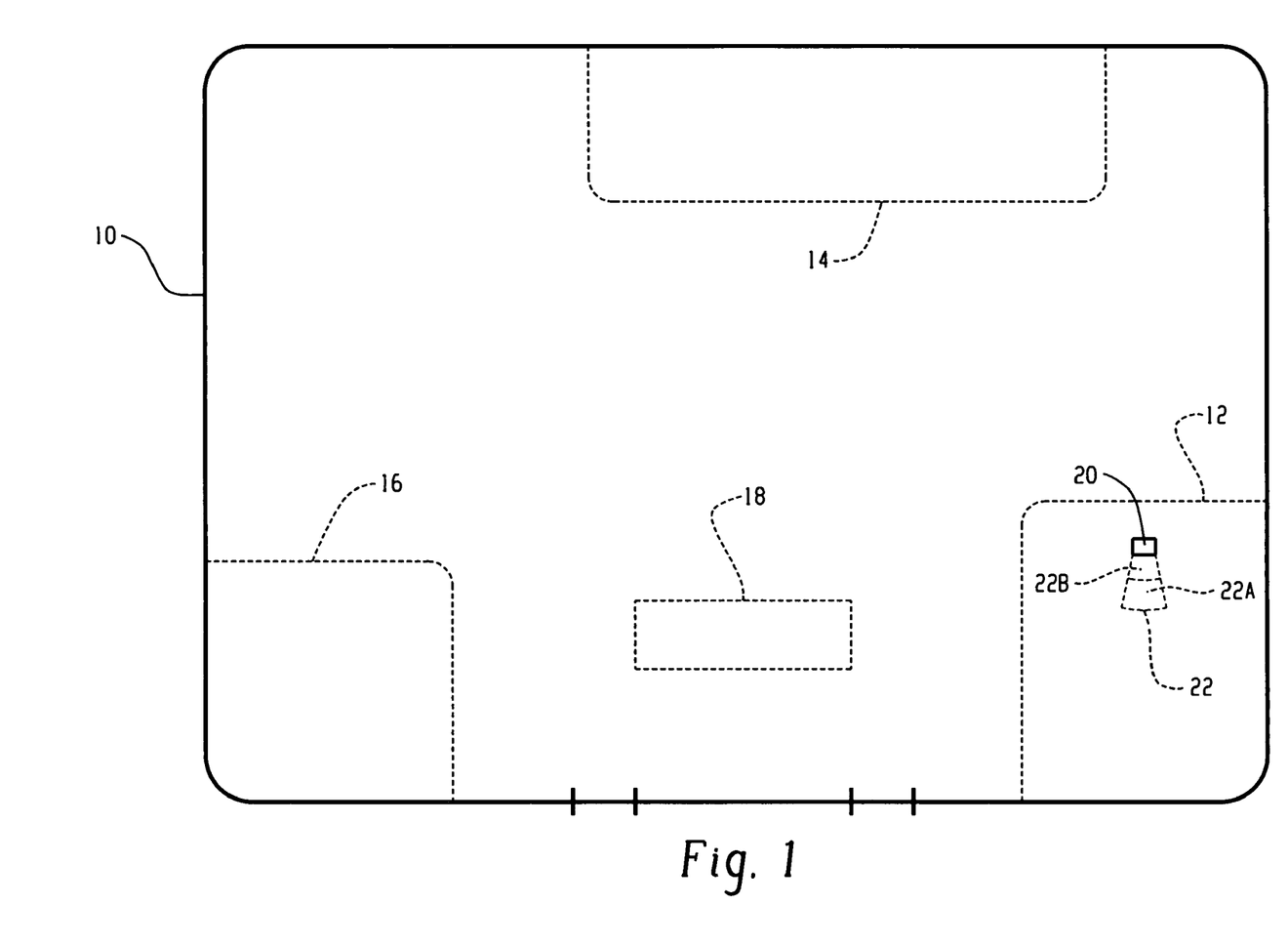
FIG. 1 is plan view of a supermarket including various departments and a self-service scale.

Referring to FIG. 1, an exemplary grocery store 10 including multiple perishables departments such as fruit and vegetable department 12, meat and fish department 14 and deli department 16 is shown. Also shown is the customer checkout location 18 that typically include multiple checkout lanes. A self-service scale system 20 is shown located in the fruit and vegetable department 12. The scale system 20 is preferably positioned at a location within the department that maximizes movement of customers thereby. The scale system 20 includes a voice capability and a customer detection capability as will be described in greater detail below. In general, the scale system 20 is operated so that when a store customer is detected within an area 22 in proximity to a weighing station of the scale system 20, the voice capability is activated to output an audible message to the customer. As used herein the terminology "detecting a customer" or "detecting a person" is satisfied by (i) detecting the body of the customer/person or (ii) detecting an object associated with the customer/person, such as a shopping cart or some type of identification unit carried by the customer.

In one embodiment the scale system 20 includes a customer detection capability enabling detection of the customer in at least both a first area 22A in proximity to the scale weighing station and a second area 22B in proximity to the scale weighing station, and the voice capability is used to output a first message if the customer is detected in the first area 22A and to output a second message if the customer is detected in the second area 22B. Where the second area 22B is closer to the scale weighing station than the first area 22A as shown in FIG. 1, the first message may comprise a message to attract the customer closer to the scale weighing station (e.g., "Weigh And Label Your Own Fruits And Vegetables Here") and the second message may comprise a message instructing the customer on how to utilize the scale system (e.g., "Place The Item On The Scale And Enter The PLU Number Of The Item"), where PLU number stands for the well known price look-up number that is given to each random weight product. In this manner, customers who might not otherwise intend to use the scale system may be initially attracted toward the scale weighing station by the first message, with the second, instruction message giving the customer the necessary confidence to weigh and label his/her own food products at an appropriate time, namely when the customer is located closer to the scale weighing station.

Figure 2:
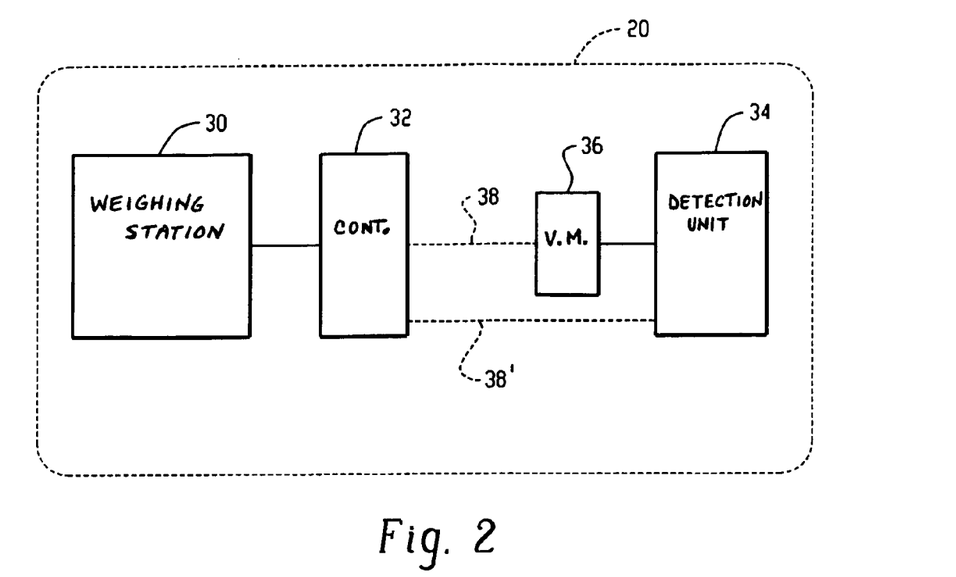
FIG. 2 is a schematic illustration of one embodiment of a scale system including a detection unit and voice module.

Referring now to FIG. 2, a schematic of an exemplary scale system 20 is shown. The scale system 20 includes a weighing station 30 for receiving items to be weighed. The weighing station may take the form of a weighing platform having an associated mechanism, such as a load cell, for producing weight indicative signals. A controller 32 is connected for receiving weight indicative signals from the mechanism of the weighing station 30 and is operable to establish a price for a weighed item based in part upon a weight indicative signal produced for that item. The controller 32 may include memory storing a database of price information (e.g., price/pound for each item) to assist in establishing the price, or in another example the controller may operate to access a database of price information that is located remotely, such as in memory of another scale or memory of a store computer system. A detection unit 34 is located for detecting a customer within an area in proximity to the weighing station 30. A voice module 36 has at least one stored message and an associated audio output device for outputting the message in an audible manner. The voice module 36 is operatively connected with the detection unit 34 so as to output the message when the detection unit detects the customer in the area. In the illustrated embodiment the detection unit 34 and voice module 36 may be separate from the controller 32, in which case no communications occur therebetween. Alternatively, the voice module 36 may be interconnected as represented by dashed line 38 to enable the controller 32 to trigger output of one or more voice messages. The voice module 36 might also be connected to the detection unit 34 through the controller 32 via connections 38' and 38.

Figure 3:
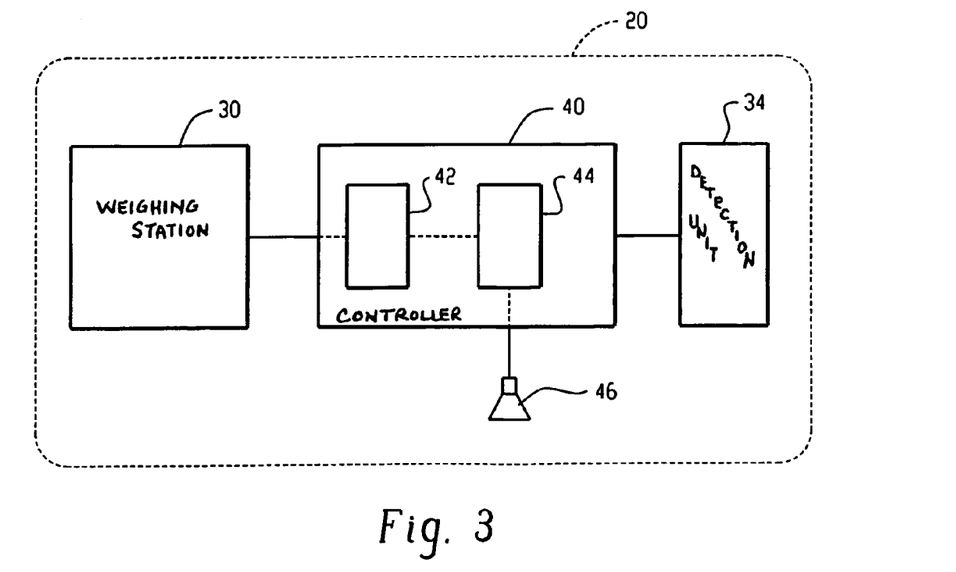
FIG. 3 is a schematic illustration of another embodiment of a scale system including a detection unit and voice module.

In still another embodiment, shown in FIG. 3, a controller 40 combines the functions of controller 32 and 36 of FIG. 1, such that the controller 40 incorporates a control portion 42 for pricing weighed items and a voice control 44 for producing the audible messages, with the voice control 44 connected to an associated speaker 46 or other audio output device. In such case the combination of the voice control 44 and speaker 46 forms a voice module, and the voice module is considered interconnected with the controller 40. It is also contemplated that portions of the detection unit 34, particularly circuitry and/or processing portions, could be integrated into the controller 40.

Figure 4:
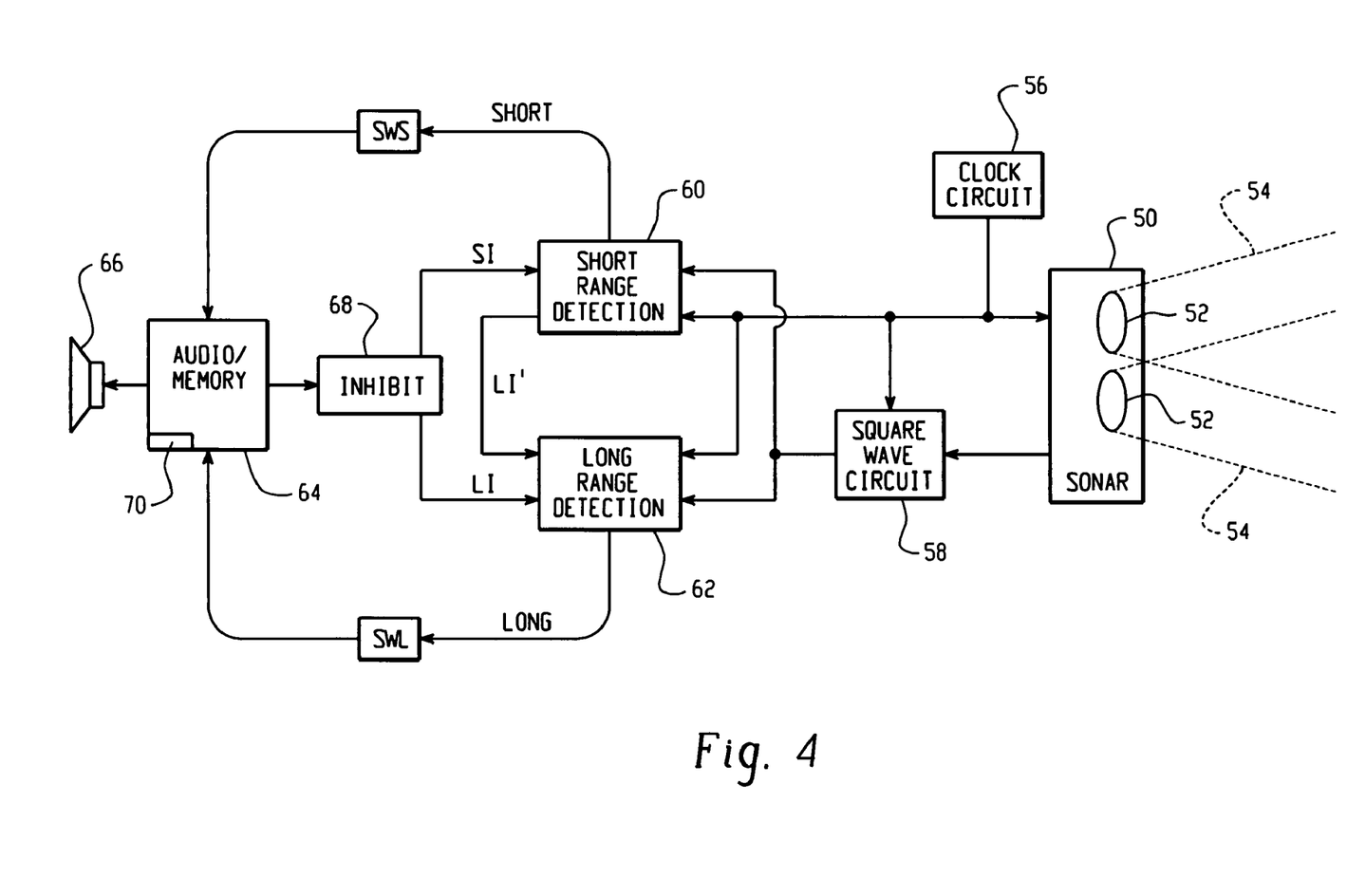
FIG. 4 is a schematic illustration of one embodiment of a detection unit and voice module.

Referring now to FIG. 4, a more detailed layout of one embodiment of a detection unit and voice module combination is shown. A sonar module 50 includes two ultrasonic transducers 52 for outputting ultrasonic signals and detecting echos as they bounce back. The illustrated transducers 52 include respective signal fields 54 that overlap. A clock circuit 56 provides a trigger input to the sonar module 50, a square wave circuit 58 and short and long range detection modules 60 and 62. In one embodiment the clock circuit 56 outputs a trigger signal about every 1–5 seconds, but variations are possible. Responsive to the trigger input, the sonar module 50 outputs a pulse signal from each of the transducers 52 and the square wave circuit changes the state of its output from low to high. The output of the square wave circuit is input to both a short range detection module 60 and a long range detection module 62. The sonar module 50 is connected to provide any feedback echo to the square wave circuit 58, with such an echo causing the square wave circuit 58 to change the state of its output from high back to low.

The long range detection module 62 examines the signal output by the square wave circuit 58. If the signal output by the square wave circuit remains high for a time period corresponding to a customer being within a defined long range of the scale and its weighing station, then the module 62 outputs a customer detected signal LONG through a switch SWL to an audio/memory module 64. The time period may relate back to when the long range detection module receives the clock trigger signal. The short range detection module 60 examines the signal output by the square wave circuit 58. If the signal output by the square wave circuit remains high for a time period corresponding to a customer being within a defined short range of the scale and its weighing station, then the module 60 outputs a customer detected signal SHORT through a switch SWH to the audio/memory module 64. Again, the time period may relate back to when the short range detection module receives the clock trigger signal. The further away the customer is, the longer the output of the square wave circuit 58 will stay high, due to the longer time taken for the acoustic pulse to travel to the customer and be reflected back as an echo. In one example the defined long range may be somewhere between about 6–10 feet and the defined short range may be somewhere between about 2–4 feet. However, it is recognized that many variations of such ranges are possible.

Where the customer is within the long range but not the short range, the customer detected signal LONG is produced. The switch SWL is a multi-position switch, such as a dip switch, that controls which one of multiple messages stored in the audio/memory module 64 is output to the speaker 66 when the customer detected signal LONG is produced. The audio/memory module also provides a feedback signal to an inhibit unit 68 that responsively outputs a short inhibit signal SI to the short range detection module 60 and a long range inhibit signal LI to long range detection module 62. The inhibit signals prevent the detection units from outputting their respective signals LONG and SHORT for a time period corresponding to the audio message output by the audio/memory module.

Where the customer is within the short range, the customer detected signal SHORT is produced and an inhibit signal LI' is also produced and acts as an interlock to prevent the module 62 from outputting the LONG signal. The switch SWS is a multi-position switch that controls which one of multiple messages stored in the audio/memory module 64 is output to the speaker 66 when the customer detected signal SHORT is produced. Again, the audio/memory module 64 also provides a feedback signal to inhibit unit 68 that responsively outputs the short inhibit signal SI to the short range detection module 60 and the long range inhibit signal LI to long range detection module 62. These inhibit signals prevent the detection units from outputting their respective signals LONG and SHORT for a time period corresponding to the audio message output by the audio/memory module.

Referring in more detail to the switches SWL and SWS, the audio/memory module 64 may store multiple voice messages as previously noted, including multiple possible voice messages that would be suitable for triggering by short range detection module 60 and multiple possible voice messages for triggering by the long range detection module 62. The store personnel can use the switches SWL and SWS to set which messages and given scale will output.

The audio/memory module 64 may include an appropriate interface 70 for adjusting the multiple stored messages. For example, store personnel might connect a personal computer directly to the interface for the purpose of downloading messages to the module. In another example, a portable programming module including its own speaker might be connectable to the interface, enabling store personnel to verify the messages they are downloading. In either case, the downloads can be performed at the location of the scale within the store with little difficulty.

In one embodiment the ultrasonic ranging system may utilize may be 600 Series sensors and 6500 Series ranging modules available from Senscomp Inc. of Livonia, Mich., and the voice module may utilize a model number QV301M3 unit available from Quadravox, Inc. of Richardson, Tex. However, other devices and technologies could be used.

It is recognized that FIG. 4 represents only one possible embodiment. In other embodiments simple software routines could be used to measure the time taken for an echo to be received, calculate the distance corresponding to the received echo, and then output an appropriate message based upon the calculated distance. The software could include one or more routines to prevent output of messages at certain times. For example, prevent message output when another message is being played, or preventing output of a "long range" message when a customer is also detected within the "short range."

In embodiments where the scale controller is interconnected with the voice module, such as a where a communications link is provided between the two or where the voice module is integrated with the controller, normal scale communication systems could be used to download message from remote locations such as a store computer or regional computer. A standard input device of a scale (see FIG. 5) might also be used to select active messages. Such embodiments might also provide for advanced voice functions. For example, output of a certain message (e.g., "Enter PLU Number For Item") might be triggered when an item is initially placed on the weighing station. As another example, output of a certain message (e.g., "PLU Number Invalid, Please Re-Enter") may be triggered if the customer enters an improper product identifying code. As another example, output of a certain message (e.g., "Please Apply Printed Label To Product") may be triggered when a label is printed by a label printer of the scale system. In still a further example, output of a certain message (e.g., a marketing message relating to the weighed product) might be triggered when the customer enters the product code for the weighed product. In yet another example, output of a certain message (e.g., a marketing message relating to a product that is different than but complimentary to the weighed product) when the customer enters the product code of the weighed product.

Figure 5:
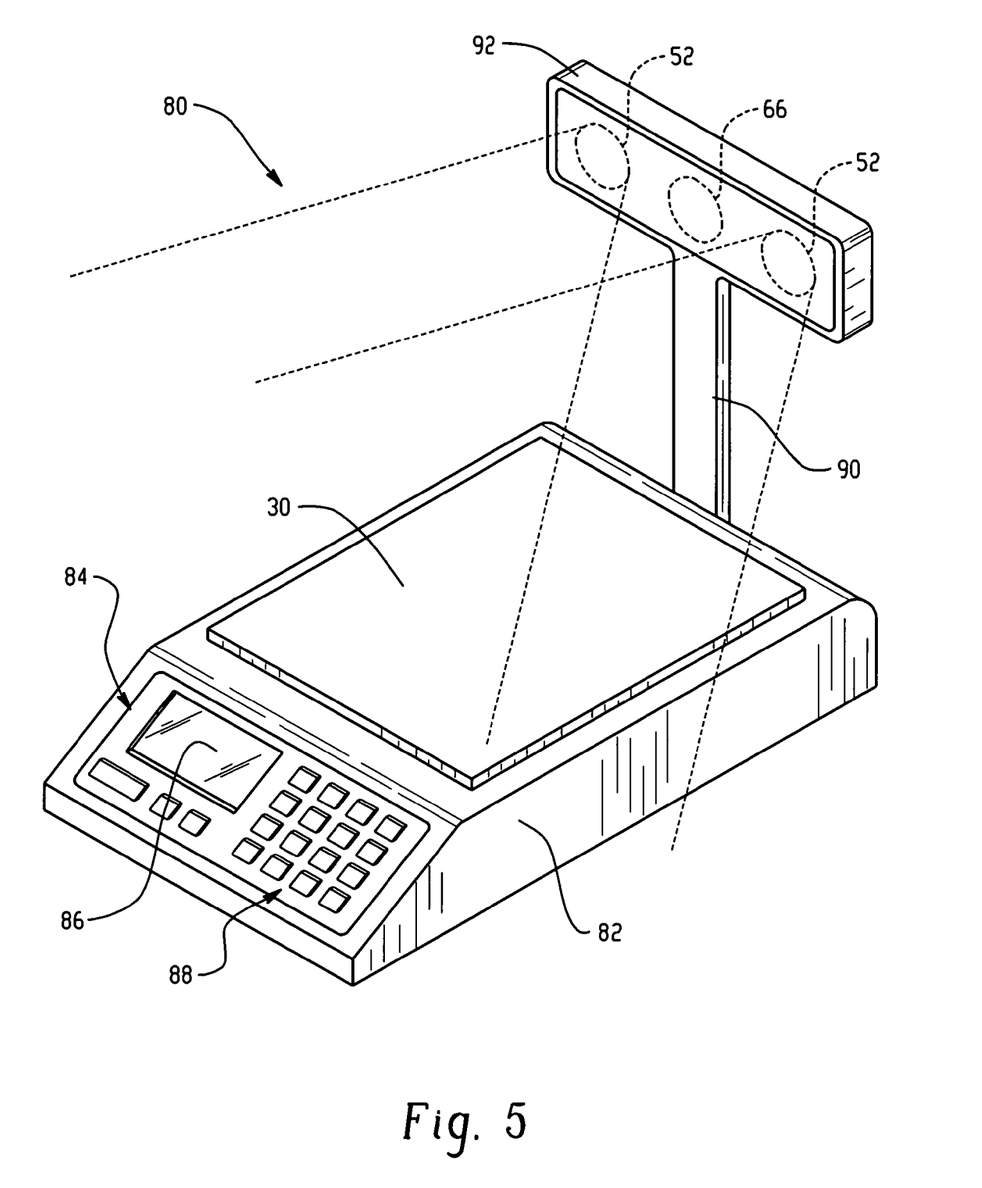
FIG. 5 is a perspective view of one embodiment of a scale.

Referring now to FIG. 5, in one embodiment the detection unit and voice module may be incorporated within portions of a scale housing. In particular, a scale 80 is shown with weighing station 30 atop a base 82 of the scale. A user interface 84 includes a display screen 86 and input device 88 in the form of a plurality of buttons distributed around the display screen 86. It is recognized that other types of user interfaces, including both currently available and hereafter developed technologies, could be used for providing information to and receiving information from customers. A post 90 extends upward from the base 82 and includes a housing 92 at the top thereof. The ultrasonic transducers 52 may be located in the housing 92, along with speaker 66. Other parts of the detection unit and voice module may also be located in the housing 92 or within the base 82 as desired. In the illustrated embodiment the transducers 52 output their pulses in a direction over the base so that the scale 80 would be positioned to detect customers that approach it from a direction in which they can easily see the important parts of the scale 80, namely the weighing station 30 and the user interface 84. In another embodiment a scale system could be formed with the detection unit and/or voice module in a housing that is completely separate from the scale housing, but located in proximity to the scale housing. In an alternative embodiment the transducers 52 could be located more remotely from the weighing station 30, in which case the distances indicated by the transducers might not reflect exact distances from the weighing station 30, but would still be indicative of a customers' distance from the weighing station.

Although the invention has been described and illustrated in detail it is to be clearly understood that the same is intended by way of illustration and example only and is not intended to be taken by way of limitation.

In particular, while an ultrasonic based detection system is primarily described, it is recognized that other types of detection systems could be used. For example, in some stores it may be possible to use a number of simple light element and photo detector pairs arranged to detect a customer passing between two food product display units as the customer approaches the weighing station. In another embodiment a pressure sensitive floor might be located in proximity to the weighing station for customer detection.

Further, while the primary embodiment is described with reference to self-service scales used in supermarkets, groceries and other stores, it is recognized that the multiple stage voice messaging described above could be utilized in conjunction with other types of electronic devices (e.g., ATMs) where the desire is to first attract people closer to the device and then instruct people on use of the device. Still further, while the primary embodiment describes a two stage messaging arrangement, it is recognized that a single detection range or three or more detection ranges or distances could be set up to provide a single message of three or more corresponding messages.

Although the primary embodiment describes a scale system in which detection of customers triggers all voice messages, it is recognized that some voice messages could be output without detection of customers (e.g., at a regular or varying time interval). As one example, a scale system located in a perishables department of a store could be configured to output an audible message to attract customers closer to the weighing station from time to time, without detection of a customer. The scale system could follow the customer attracting message with an instruction message on use of the scale system. Alternatively, the instruction message could be triggered by some customer action, such as placing an item on a weighing station or pressing a button on a user interface of the scale system.

It is recognized that numerous other variations exist, including both narrowing and broadening variations of the appended claims.

What is claimed is:

1. A scale system for use by store customers in weighing food products, comprising:
    a weighing station for receiving items to be weighed, the weighing station having an associated mechanism for producing weight indicative signals;
    a controller for receiving weight indicative signals from the mechanism, the controller operable to establish a price for a weighed item based in part upon a weight indicative signal produced for that item;
    a detection unit for detecting a customer within an area in proximity to the weighing station;
    a voice module having an associated audio output device for outputting messages in an audible manner;
    wherein the detection unit operates to detect if the customer is within a first range of the weighing station and to detect if the customer is within a second range of the weighing station, and the voice module stores first and second messages and operates to output the first message if the customer is detected within the first range and to output the second message if the customer is detected within the second range.

2. The scale system of claim 1 wherein the second range is closer to the weighing station than the first range, the first message comprises a message to attract the customer closer to the weighing station and the second message comprises a message instructing the customer on how to utilize the scale system.

3. The scale system of claim 1 wherein the detection unit and voice module are separate from the controller.

4. The scale system of claim 1 wherein the controller and the voice module are interconnected, the voice module stores multiple additional messages, and the controller is operable to effect output of one or more of the additional messages.

5. The scale system of claim 4 wherein the controller is operable to effect output of a certain one of the additional messages when an item is initially placed on the weighing station.

6. The scale system of claim 4 wherein the controller is operable to effect output of a certain one of the additional messages if the customer enters an improper product identifying code via a customer input device.

7. The scale system of claim 4 wherein the controller is operable to effect output of a certain one of the additional messages when a label is printed by a label printer of the scale system.

8. The scale system of claim 4 wherein the controller is operable to effect output of a certain one of the additional messages if the customer enters a certain product code, where the certain one of the additional messages is a marketing message relating to the product identified by the certain product code.

9. The scale system of claim 4 wherein the controller is operable to effect output of a certain one of the additional messages if the customer enters a certain product code, where the certain one of the additional messages is a marketing message relating to a product that is different than but complimentary to the product identified by the certain product code.

10. The scale system of claim 1 wherein the system further includes a message selector.

11. The scale system of claim 10 wherein the message selector comprises a mechanically actuated switch.

12. The scale system of claim 10 wherein the message selector comprises an input device of the scale system.

13. The scale system of claim 1 wherein the detection unit comprises an ultrasonic ranging unit including at least one ultrasonic transducer and a control portion for evaluating range.

14. The scale system of claim 13 wherein the ultrasonic ranging unit includes multiple ultrasonic transducers arranged with partially overlapping detection areas.

15. The scale system of claim 1 further including a label printer mechanism for printing and outputting product pricing labels for products weighed at the weighing station.

16. A scale system for weighing and pricing items, comprising:
    a weighing unit including a weighing station for receiving items to be weighed, a mechanism for producing weight indicative signals when items are placed on the weighing station and a control portion that operates to establish a price for a weighed item based in part upon a weight indicative signal produced for that item;
    a detection unit for detecting a person within a set distance from the weighing station, the detection unit comprises an ultrasonic ranging unit including at least one ultrasonic transducer and a control portion for evaluating range, the weighing station sits atop a first housing and the ultrasonic transducer is located in a second housing that is located higher than the weighing station, a support member extends upward from the first housing to support the second housing;
    a voice module having at least one stored message and an associated audio output device for outputting the message in an audible manner, the voice module operates to output the message when the detection unit detects the person within the set distance.

17. The scale system of claim 16 wherein first and second ultrasonic transducers with partially overlapping detection areas are located in the second housing.

18. The scale system of claim 3 wherein the detection unit operates to both detect if the person is within at least both a first distance from the weighing station and to detect if the person is within a second distance from the weighing station, the voice module stores first and second voice messages and operates to output the first message if the detection unit detects the person within the first distance and to output the second message if the detection system detects the person within the second distance, wherein the second distance is shorter than the first distance and the detection system includes an interlock to prevent triggering of the first message when a person is detected within the second distance.

19. The scale system of claim 18 wherein the second distance is shorter than the first distance, the first message comprises a message to attract the person closer to the weighing station and the second message comprises a message instructing the person on how to utilize the scale system.

20. In a store including a perishables food department having a self-service scale and associated label printing mechanism located therein, a method of promoting customer use of the self-service scale comprising the steps of:

detecting a customer at a first location spaced from the scale using a detection unit that generates a first detect signal in response to such detection;

outputting a first audible message for attracting the customer closer to the scale in response to the first detect signal;

detecting the customer at a second location nearer the scale than the first location using the detection unit, the detection unit generates a second detect signal in response to such detection; and outputting a second audible message including one or more instructions for using the scale in response to the second detect signal.

21. The method of claim 20 wherein the detecting steps involve the use of an ultrasonic ranging unit.

22. A self-service electronic device adapted to promote usage thereof by persons in proximity to the device, the device comprising:

a user interface for receiving information from a person;

a detection unit configured to generate a first detect signal in response to detecting a person at a first location relative to the user interface and configured to generate a second detect signal in response to detecting a person at a second location relative to the user interface, the second location closer to the user interface than the first location; and a voice module having at least first and second stored messages and an associated audio output device for outputting messages in an audible manner, the voice module operates to output the first message in response to the first detect signal and to output the second message in response to the second detect signal, where the first message comprises a message to attract persons closer to the user interface and the second message comprises a message instructing persons on use of the electronic device.

23. The electronic device of claim 22 wherein the first location comprises a first area and the second location comprises a second area.

24. A method comprising:

locating a self-service scale device within a perishables department of a store, the self-service scale having an associated label printing mechanism located therein, an associated customer detection unit and an associated voice module;

operating the detection unit to provide customer detection for a customer within a first distance of the self-service scale and the provide customer detection for a customer within a second distance of the self-service scale, the second distance shorter than the first distance;

operating the voice module such that a first audible message is output responsive to customer detection within the first distance and a second audible message is output responsive to customer detection within the second distance;

upon customer detection within the second distance, an interlock is initiated to prevent output of the first message even upon subsequent customer detection within the first distance.

* * * * *

UNITED STATES PATENT AND TRADEMARK OFFICE
CERTIFICATE OF CORRECTION

PATENT NO. : 6,982,388 B2
DATED : January 3, 2006
INVENTOR(S) : Harvey A. Kasinoff It is certified that error appears in the above-identified patent and that said Letters Patent is hereby corrected as shown below:

<u>Column 8,</u>
Line 46, after "Claim", change "3" to -- 16 --.

<u>Column 10,</u>
Line 17, after "and", change "the" to -- to --.

Signed and Sealed this

Fourth Day of April, 2006

JON W. DUDAS
*Director of the United States Patent and Trademark Office*